US011722037B2

United States Patent
Keum et al.

(10) Patent No.: US 11,722,037 B2
(45) Date of Patent: *Aug. 8, 2023

(54) INTERIOR PERMANENT MAGNET MOTOR HAVING CONTROLLABLE COOLANT DISTRIBUTION

(71) Applicant: GM Global Technology Operations LLC, Detroit, MI (US)

(72) Inventors: SeungHwan Keum, Northville, MI (US); Insu Chang, Troy, MI (US); Jun-mo Kang, Ann Arbor, MI (US); Young J. Kim, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 229 days.

This patent is subject to a terminal disclaimer.

(21) Appl. No.: 17/315,730

(22) Filed: May 10, 2021

(65) Prior Publication Data
US 2022/0360144 A1     Nov. 10, 2022

(51) Int. Cl.
*H02K 9/19*     (2006.01)
*H02K 3/28*     (2006.01)
*H02K 5/20*     (2006.01)

(52) U.S. Cl.
CPC ............ *H02K 9/19* (2013.01); *H02K 3/28* (2013.01); *H02K 5/203* (2021.01)

(58) Field of Classification Search
CPC ..................... H02K 9/19; H02K 2209/00
(Continued)

(56) References Cited

U.S. PATENT DOCUMENTS

| 6,987,337 B2 * | 1/2006 | Lowther .......... H02K 9/10 310/58 |
| 2010/0259118 A1 | 10/2010 | Kitagawa |

(Continued)

FOREIGN PATENT DOCUMENTS

| JP | 2008029170 A | 2/2008 |
| JP | 2019146376 A | 8/2019 |
| WO | 2020105467 A1 | 5/2020 |

*Primary Examiner* — Quyen P Leung
*Assistant Examiner* — Minki Chang
(74) *Attorney, Agent, or Firm* — Vivacqua Crane PLLC

(57) ABSTRACT

An interior permanent magnet motor having controllable coolant distribution is provided. The motor comprises a motor housing and a rotary shaft connected to a rotor rotatably disposed in the housing. The motor further comprises a stator unit disposed in the housing and comprising conductive windings arranged about the rotor. The windings have a straight portion radially extending to an end-turn portion. The motor further comprises an oil sump disposed on the housing above the stator unit. The oil sump comprises a reservoir having an inner side and an outer side. The reservoir has at least one aperture formed therethrough over the end-turn portion. The motor further comprises a movable nozzle having a first open end extending to a second open end. The first open end is connected to the at least one aperture such that the movable nozzle and reservoir are in fluid communication. The second open end extends from the at least one aperture and positioned adjacently above the end turn portion for coolant distribution. The motor further comprises a connector movably disposed in the housing proximate to the movable nozzle. The motor further comprises a cam connected to the connector and in contact with the nozzle. Upon movement of the connector, the cam is arranged with the connector to move the second open end of the nozzle over the end turn portion for distribution of coolant oil from the oil sump to the end turn portion.

20 Claims, 3 Drawing Sheets

(58) Field of Classification Search
USPC .................................. 310/53, 54, 57, 58, 59
See application file for complete search history.

(56) References Cited

U.S. PATENT DOCUMENTS

| | | |
|---|---|---|
| 2019/0044416 A1 | 2/2019 | Pydin |
| 2021/0328480 A1 | 10/2021 | Kosaka |
| 2023/0020219 A1* | 1/2023 | Chang ...................... H02K 9/19 |

* cited by examiner

INTERIOR PERMANENT MAGNET MOTOR HAVING CONTROLLABLE COOLANT DISTRIBUTION

INTRODUCTION

The present disclosure relates to distributing coolant in an interior permanent magnet motor and, more particularly, an interior permanent magnet motor having controllable coolant distribution over a stator unit thereof.

Many battery electric vehicles are operated with an interior permanent magnet (IPM) motor. Many IPM motors are cooled with coolant or coolant oil or transmission oil. During vehicle operation, current IPM motors may experience an undesirable maldistribution of coolant to the IPM motor due lack of control of coolant distribution, change in motion, and frame tilt of the vehicle. A maldistribution of coolant to the IPM motor may lead to an undesirable hot spot on an area of the motor.

SUMMARY

Thus, while current interior permanent magnet (IPM) motors achieve their intended purpose, there is a need for an improved IPM motor having controllable coolant distribution and a system for controlling coolant distribution in an IPM motor of a vehicle.

In accordance with one aspect of the present disclosure, an interior permanent magnet motor having controllable coolant distribution is provided. The motor comprises a motor housing and a rotary shaft connected to a rotor. The rotor is rotatably disposed in the housing. The motor further comprises a stator unit disposed in the housing and comprising conductive windings arranged about the rotor. The windings have a straight portion radially extending to an end-turn portion.

The motor further comprises an oil sump disposed on the housing above the stator unit. The oil sump comprises a reservoir having an inner side for containment of coolant (or coolant oil or transmission oil) and an outer side arranged above the end-turn portion. The reservoir has at least one aperture formed therethrough over the end-turn portion extending from the straight portion.

In this aspect, the motor further comprises a movable nozzle having a first open end extending to a second open end. The first open end is connected to the at least one aperture such that the movable nozzle and reservoir are in fluid communication. The second open end extends from the at least one aperture and positioned adjacently above the end turn portion for coolant distribution. The motor further comprises a connector being movably disposed in the housing proximate to the movable nozzle.

The motor further comprises a cam having a first portion extending to a second portion. The first portion is connected to the connector and the second portion being in contact with the nozzle. Upon movement of the connector, the cam is arranged with the connector to move the second open end of the nozzle over the end turn portion for distribution of coolant oil from the oil sump to the end turn portion.

In one embodiment, the stator comprises a core within which the conductive windings are radially disposed and radially extending therefrom. The core is disposed about the straight portion of the windings. The end-turn portion radially extends from the core.

In another embodiment, the straight portion has a first radial side extending to a second radial side. The end-turn portion having a first turn portion radially extending from the first radial side and a second turn portion radially extending from the second radial side. The core is arranged about the straight portion of the windings. The first and second turn portions radially extend from the core.

In yet another embodiment, the at least one aperture is a plurality of apertures. Each aperture is formed through the reservoir over one of the first and second turn portions extending from the core.

In still another embodiment, the movable nozzle is a plurality of movable nozzles. Each aperture is connect to one movable nozzle such that the reservoir and each movable nozzle are in fluid communication. Each second open end extending from the reservoir and positioned adjacently above one of the first and second turn portions for coolant distribution.

In another embodiment, the connector is a plurality of connectors movably disposed in the housing proximate the plurality of movable nozzles. The plurality of connectors comprises a plurality of cams. Each cam has a first portion extending to a second portion. The first portion is connected to the connector and the second portion being in contract with one of the plurality of nozzles. Upon movement of each of the connectors, each cam is arranged to move one of the second open ends of one of the nozzles over one of the first and second turn portions for distribution of coolant oil from the oil sump.

In one embodiment, the movable nozzle is comprised of polymeric material. In another embodiment, the second portion of the cam is in slidable contact with the nozzle by way of a connecting track. In yet another embodiment, the movable nozzle is comprised of metallic material. In still another embodiment, the cam is comprised of metal and the second portion of the cam is in slidable magnetic contact with the nozzle by way of a connecting magnet.

In another aspect of the present disclosure, an interior permanent magnet motor having controllable coolant distribution is provided. The motor comprises a motor housing and a rotary shaft connected to a rotor. The rotor is rotatably disposed in the housing. A stator unit is disposed in the housing and comprises a core within which conductive windings are radially disposed and radially extending therefrom. The windings are arranged about the rotor and have a straight portion radially extending to an end-turn portion. The core is arranged about the straight portion of the windings. The end-turn portion radially extends from the core.

In this aspect, an oil sump is disposed on the housing above the core. The oil sump comprises a reservoir having an inner side for containment of coolant oil and an outer side arranged above the core. The reservoir has at least one aperture formed therethrough over the end-turn portion extending from the core. A movable nozzle has a first open end extending to a second open end. The first open end is connected to the at least one aperture such that the movable nozzle and reservoir are in fluid communication. The second open end extends from the at least one aperture and positioned adjacently above the end turn portion for coolant distribution.

Further to this aspect, a connector is movably disposed in the housing proximate to the movable nozzle. A cam has a first portion extending to a second portion. The first portion is connected to the connector and the second portion is in contact with the nozzle. Upon movement of the connector, the cam is arrange with the connector to move the second open end of the nozzle over the end turn portion for distribution of coolant oil from the oil sump to the end turn portion.

In an embodiment of this aspect, the straight portion has a first radial side extending to a second radial side. The end-turn portion has a first turn portion radially extending from the first radial side and a second turn portion radially extending from the second radial side. The core is arranged about the straight portion of the windings. The first and second turn portions radially extend from the core.

In one embodiment, the at least one aperture is a plurality of apertures. Each aperture is formed through the reservoir over one of the first and second turn portions extending from the core.

In another embodiment, the movable nozzle is a plurality of movable nozzles. Each aperture is connect to one movable nozzle such that the reservoir and each movable nozzle are in fluid communication. Each second open end extends from the reservoir and is positioned adjacently above one of the first and second turn portions for coolant distribution.

In yet another embodiment, the connector is a plurality of connectors movably disposed in the housing proximate the plurality of movable nozzles. The cam is a plurality of cams connected to one of the plurality of connectors. Each cam has a first portion extending to a second portion. The first portion is connected to the connector and the second portion being in contract with one of the plurality of nozzles. Upon movement of each of the connectors, each cam is arranged to move one of the second open ends of one of the nozzles over one of the first and second turn portions for distribution of coolant oil from the oil sump.

In still another embodiment, the movable nozzle is comprised of metallic material and the cam is comprised of metal. The second portion of the cam is in slidable magnetic contact with the nozzle by way of a connecting magnet.

In another aspect of the present disclosure, a system for controlling coolant distribution in an interior permanent magnet motor of a vehicle having a frame is provided. The system comprises an interior permanent magnet motor comprising a motor housing and a rotary shaft connected to a rotor. The rotor is rotatably disposed in the housing. The motor further comprises a stator unit disposed in the housing and comprising conductive windings arranged about the rotor. The windings have a straight portion radially extending to an end-turn portion.

The motor further comprises an oil sump disposed on the housing above the stator unit. The oil sump comprises a reservoir having an inner side for containment of coolant oil and an outer side arranged above the end-turn portion. The reservoir has at least one aperture formed therethrough over the end-turn portion extending from the straight portion.

In this aspect, the motor further comprises a movable nozzle having a first open end extending to a second open end. The first open end is connected to the at least one aperture such that the movable nozzle and reservoir are in fluid communication. The second open end extends from the at least one aperture and positioned adjacently above the end turn portion for coolant distribution. The motor further comprises a connector being movably disposed in the housing proximate to the movable nozzle.

The motor further comprises a cam having a first portion extending to a second portion. The first portion is connected to the connector and the second portion being in contact with the nozzle. Upon movement of the connector, the cam is arranged with the connector to move the second open end of the nozzle over the end turn portion for distribution of coolant oil from the oil sump to the end turn portion.

In this aspect, the system further comprises an actuator, a sensor, a controller, and a power source. The sensor is configured to sense one of a change in motion and a frame tilt of the vehicle. The sensor is arranged to send a signal to the controller of the one of change in motion and frame tilt. The system further comprises the actuator in communication with the connector and arranged to move the connector and the cam, thereby moving the second open end of the nozzle over the end turn portion for improved distribution of coolant oil.

In this aspect, the system further comprises the power source and the controller. The power source is configured to power the actuator. The controller is in communication with the actuator and configured to control the actuator for improved distribution of oil coolant when the signal is received from the sensor.

In an embodiment of this aspect, the stator comprises a core within which the conductive windings are radially disposed and radially extending therefrom. The core is arranged about the straight portion of the windings. The end-turn portion radially extends from the core.

In one embodiment, the straight portion has a first radial side extending to a second radial side. The end-turn portion has a first turn portion radially extending from the first radial side and a second turn portion radially extending from the second radial side. The core is arranged about the straight portion of the windings. The first and second turn portions radially extend from the core. In this embodiment, at least one aperture is a plurality of apertures. Each aperture is formed through the reservoir over one of the first and second turn portions extending from the core.

In another embodiment, the movable nozzle is a plurality of movable nozzles. Each aperture is connect to one movable nozzle such that the reservoir and each movable nozzle are in fluid communication. Each second open end extends from the reservoir and is positioned adjacently above one of the first and second turn portions for coolant distribution. In this embodiment, the connector is a plurality of connectors movably disposed in the housing proximate the plurality of movable nozzles.

In this embodiment, the cam is a plurality of cams. Each cam has a first portion extending to a second portion. The first portion is connected to the connector and the second portion is in contract with one of the plurality of nozzles. Upon movement of each of the connectors, each cam is arranged to move one of the second open ends of one of the nozzles over one of the first and second turn portions for distribution of coolant oil from the oil sump.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings descrireservoir herein are for illustration purposes only and are not intended to limit the scope of the present disclosure in any way.

DETAILED DESCRIPTION

The following description is merely exemplary in nature and is not intended to limit the present disclosure, application, or uses.

The present disclosure provides an interior permanent magnet (IPM) motor having controllable coolant oil distribution. The motor comprises a plurality of nozzles in fluid communication with an oil sump that is configured to hold coolant for gravitational distribution of coolant over a stator unit of the motor. The nozzles are movably disposed adjacently above the stator unit and are controllable such that coolant oil may be more evenly distributed to the stator unit during operation of the vehicle. A plurality of connectors in cooperation with a plurality of cams are movably connected to the nozzles such that, upon movement of the connectors, the cams move the nozzles over the stator unit. Movement of the connectors may be controlled by way of a system having an actuator in communication with the connectors. As a result, embodiments of the present disclosure help counter or compensate for a potential maldistribution of coolant oil to the stator unit of the motor. That is, the IPM motor and system thereof allow for a relatively improved distribution of coolant to the stator unit of the motor during operation of a vehicle.

Figure 1:
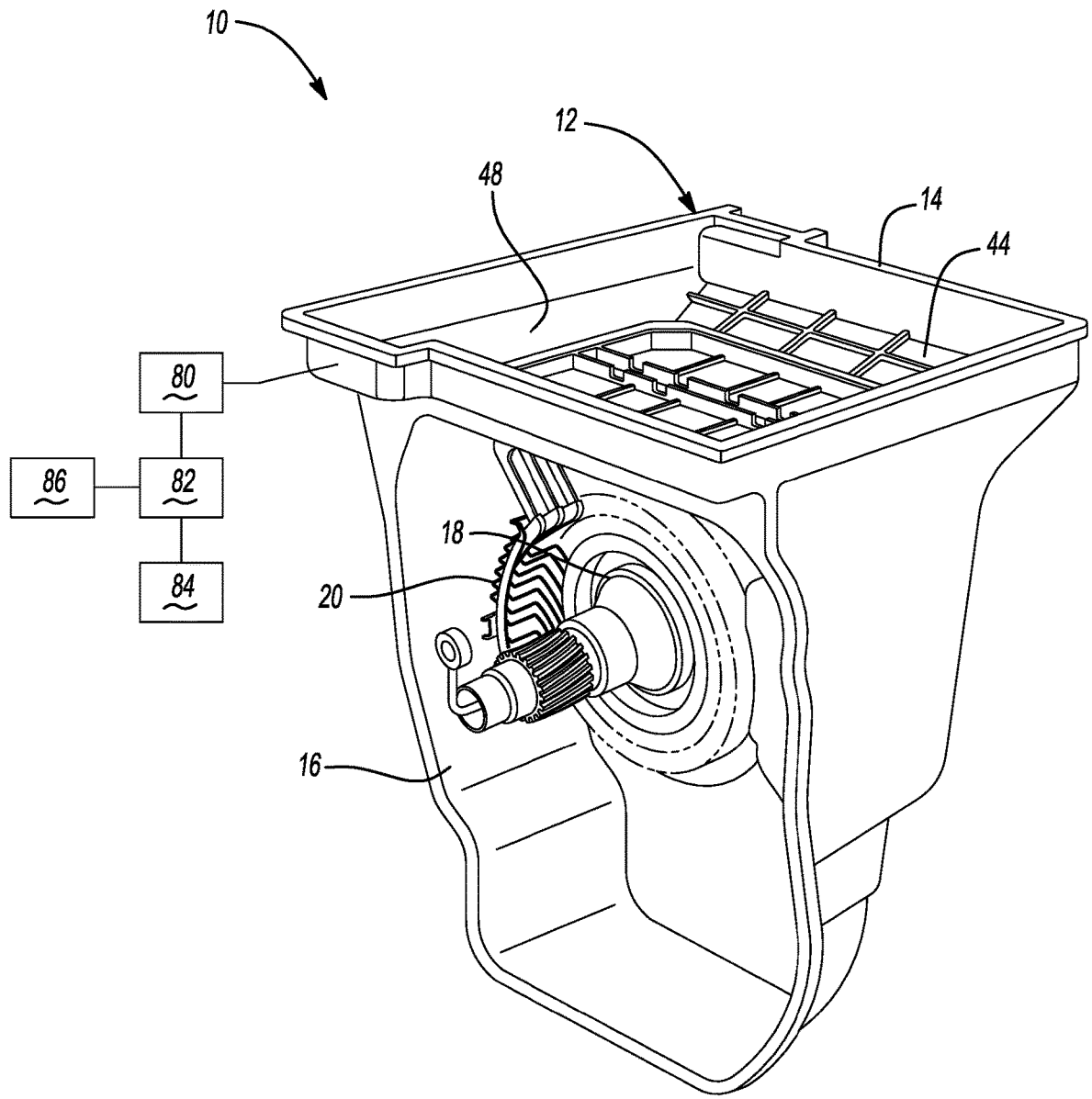
FIG. 1 is a schematic view of a system for controlling coolant distribution in an interior permanent magnet motor of a vehicle.

In accordance with one embodiment of the present disclosure, FIG. 1 illustrates a system 10 for controlling coolant distribution in an IPM motor of a vehicle having a frame. As shown, the system 10 comprises the IPM motor 12. IPM motor is composed of rotor 18. The rotor has a shaft 16 to transfer rotational motion to a transmission. The whole IPM motor sits in a housing 14.

Figure 2:
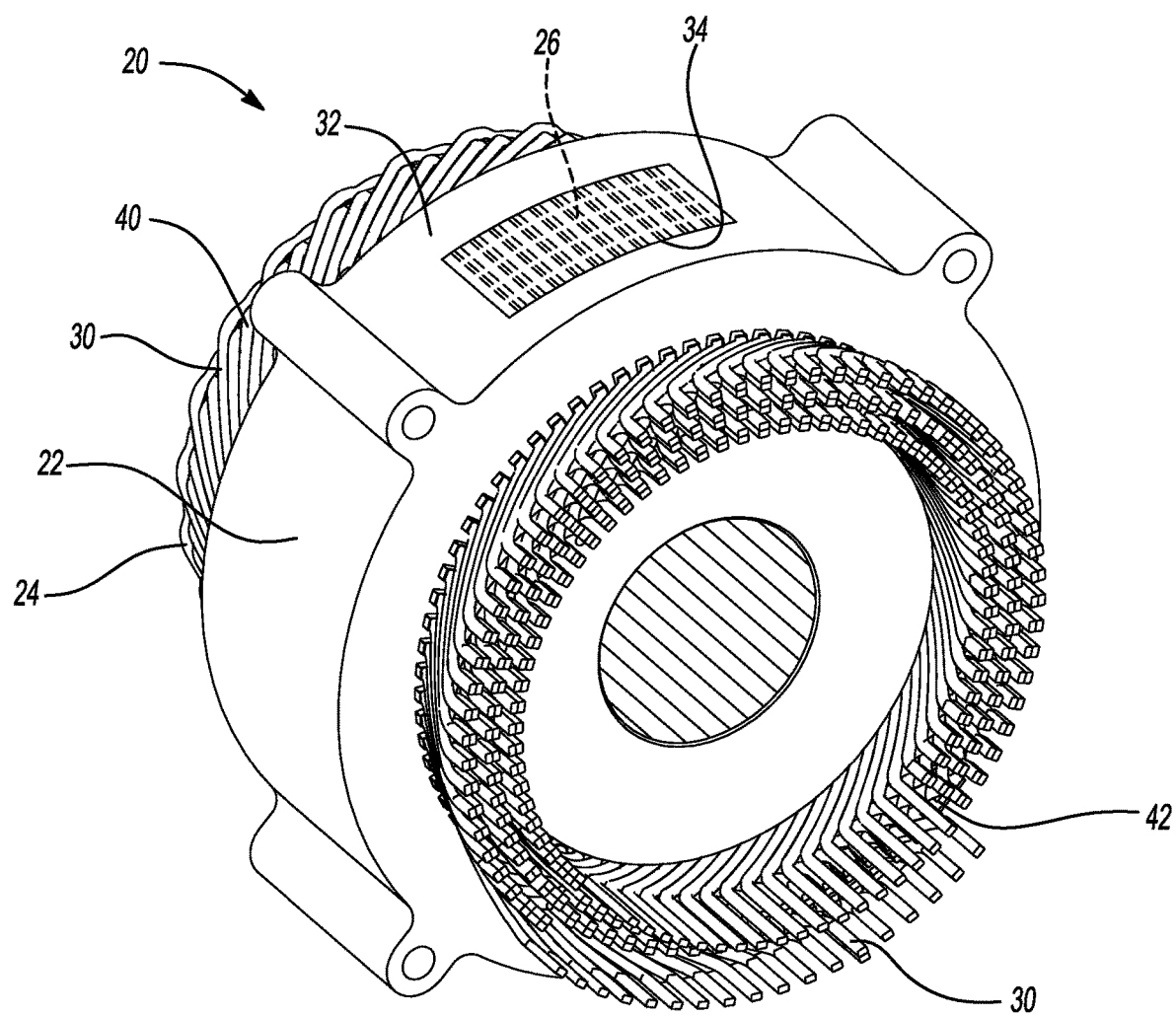
FIG. 2 is a perspective view of a stator unit of the interior permanent magnet motor.

Referring to FIGS. 1 and 2, the motor 12 further comprises a stator unit 20 disposed in the housing 14. The stator unit 20 comprises a core 22 within which conductive windings 24 are radially disposed and radially extending therefrom. In this embodiment, the windings 24 are arranged about the rotor 18 and have a straight portion 26 (shown in phantom) radially extending to end-turn portions 30. As shown, the straight portion 26 has a first radial side 32 radially extending to a second radial side 34. Moreover, the end-turn portions 30 have a first turn portion 40 radially extending from the first radial side 32 and a second turn portion 42 radially extending from the second radial side 34. As shown in FIG. 2, The core 22 is arranged about the straight portion 26 of the windings 24. The first and second turn portions radially extend from the core 22. As will be discussed below, coolant oil is distributed on the first and second turn portions during operation of the motor 12.

Figure 3:
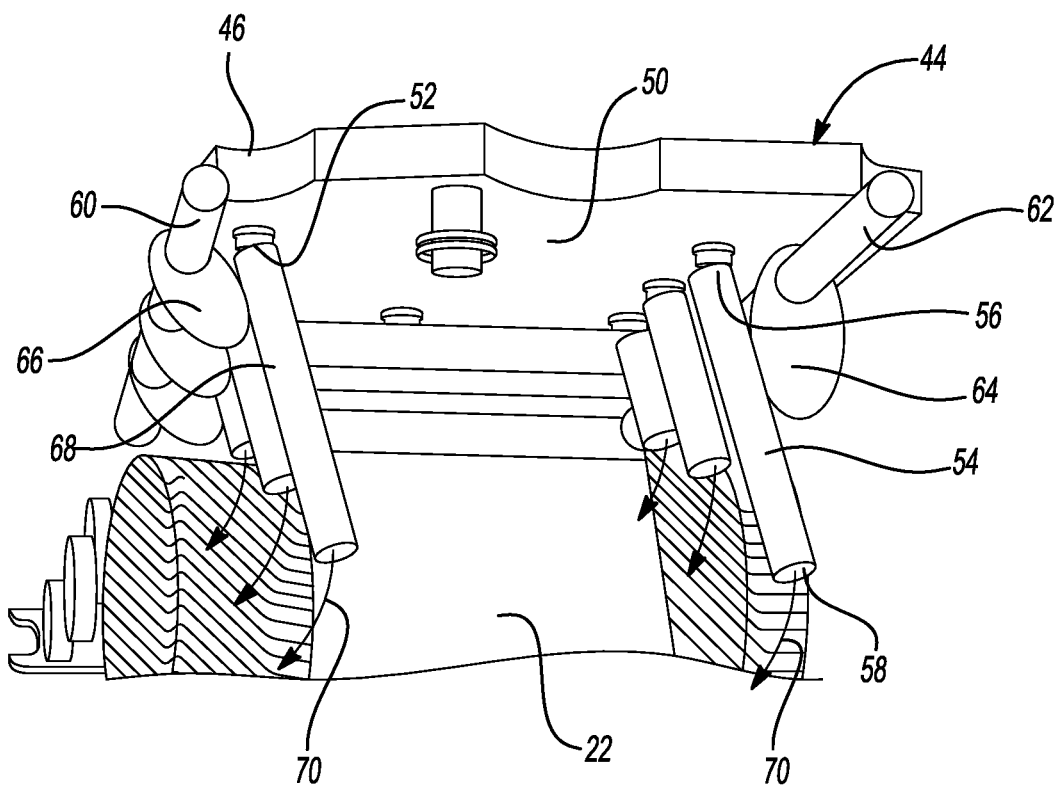
FIG. 3 is an end view of the stator unit in operation when the vehicle is tilted in a first direction.

With reference to FIGS. 1-3, the motor 12 further comprises an oil sump 44 disposed on the housing 14 above the core 22. The oil sump 44 comprises a reservoir 46 having an inner side 48 for containment of coolant (or coolant oil or transmission oil) and an outer side 50 arranged above the core 22. The reservoir 46 has at least one aperture 52, preferably a plurality of apertures 52, formed therethrough over the end-turn portions 30 (the first turn portion 40 and the second turn portion), which extend from the core 22. The apertures 52 allow for gravitational distribution of coolant to the stator unit 20. As shown in FIG. 3, each aperture 52 is formed through the reservoir 46 over one of the first and second turn portions extending from the core 22.

Figure 4:
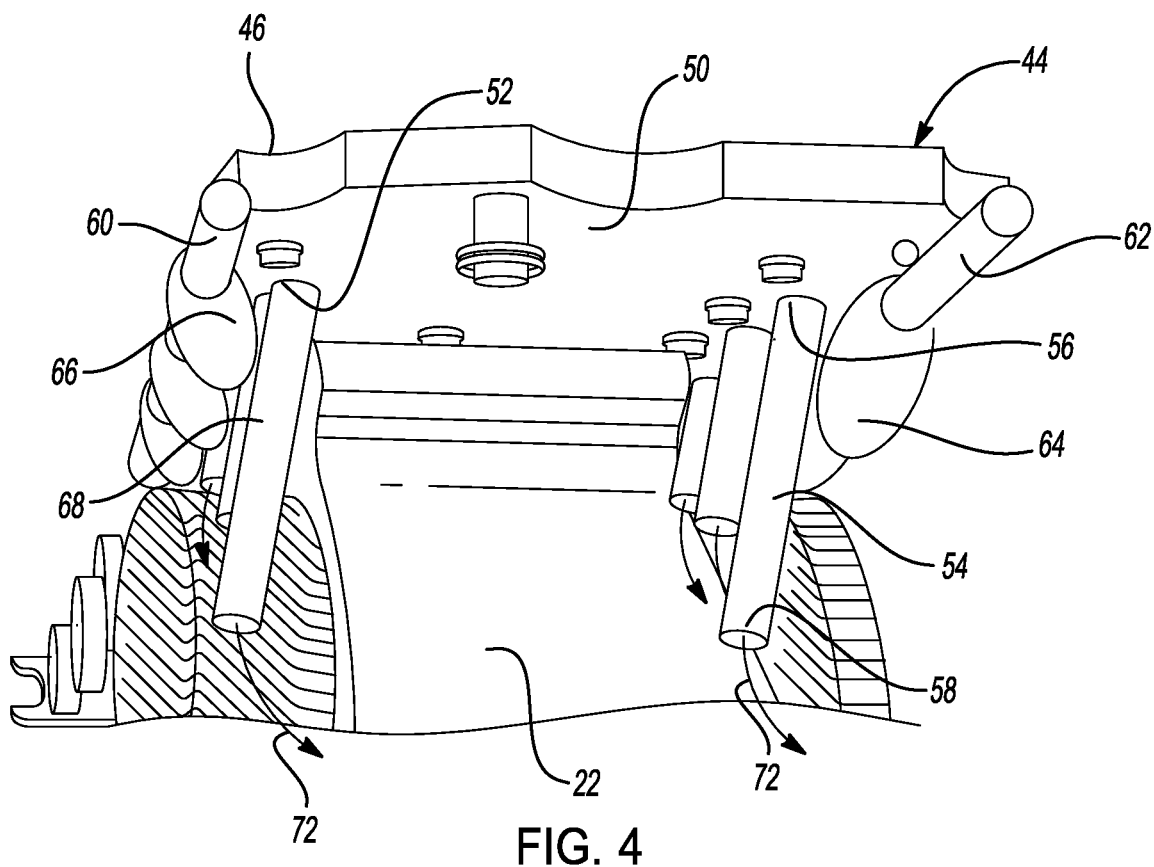
FIG. 4 is an end view of the stator unit in operation when the vehicle is tilted in a second direction.

As depicted in FIGS. 3 and 4, the motor 12 further comprises a movable nozzle or pipe 54, preferably a plurality of movable nozzles 54, having a first open end 56 extending to a second open end 58. As shown, each first open end 56 is connected to one of the apertures 52 such that each movable nozzle 54 and the reservoir 46 are in fluid communication for controlled gravitational distribution of coolant to the stator unit 20. Each second open end 58 extends from the aperture 52 to which the respective first open end 56 is connected and is positioned adjacently above the end turn portion 30 for coolant distribution. As shown, each second open end 58 is positioned adjacently above either the first turn portion 40 or the second turn portion 42 such that coolant oil may be gravitationally distributed onto the respective end turn portion 30 of the stator unit 20 in a controllable manner.

As will be discussed in greater detail below, the movable nozzles 54 are arranged to be movable over one of the first and second turn portions to provide a more even distribution of coolant oil to the motor 12. The position of the apertures 52 and the second open ends 58 above the first and second turn portions allow for coolant oil to be distributed thereon by way of gravity. During operation, movement of the second ends provides a more even distribution of coolant oil on the motor 12 as discussed in greater detail below.

It is understood that the movable nozzles 54 may be made of any suitable material such as polymeric material or metallic material without departing from the spirit or scope of the present disclosure. For example, if the nozzles 54 are comprised of metallic material, the first open end 56 may be connected to the apertures 52 by way of a flexible or pivotable connection, thereby allowing the second open end 58 to be movable relative to the end turn portions 30. Moreover, if the nozzles 54 are comprised of polymeric material, the polymeric material may be any suitable plastic to thereby allow the second open end 58 to be movable relative to the end turn portions 30.

Further to this embodiment, FIGS. 3 and 4 illustrate a plurality of connectors movably disposed in the housing 14. For example, a first connector 60 and a second connector 62 are movably disposed proximate to the movable nozzles 54. In this embodiment, the connectors are movable rods, each of which are arranged to be movable about a rotational axis. As depicted, the first connector 60 and the second connector 62 movably rotate about axes.

Referring to FIGS. 3 and 4, the first connector 60 is disposed proximately above the first turn portion 40 and the second connector 62 is disposed proximately above the second turn portion. In this embodiment, a plurality of cams 64 are connected to each of the first and second connectors 60, 62. Each cam 64 has a first portion 66 extending to a second portion 68. As illustrated, the first portion 66 is connected to the respective connector and the second portion 68 is slidably connected to one of the plurality of nozzles 54.

It is understood that the second portion 68 may be slidably connected to one of the nozzles 54 by any suitable manner without departing from the spirit or scope of the present disclosure. For example, the second portion 68 may be slidably connected to one of the nozzles 54 by way of a slider mechanism (not shown), allowing the second portion 68 to slide along a length of the nozzle 54 to thereby move the second open end 58 when the respective connector rotates about its axis. Thus, upon rotational movement of its respective connector, each cam 64 is arranged with the connector to move the second open end 58 of the nozzle 54 over the end turn portion 30 for distribution of coolant oil from the oil sump 44 to the end turn portion 30.

It is understood that the nozzles 54 and the cam 64 may be made of metallic material. In this embodiment, the second portion 68 of the cam 64 may be slidably connected to the nozzle 54 by way of a magnetic mechanism (not shown). The magnetic mechanism may allow the second portion 68 to slide along a length of the nozzle 54 to thereby move the second open end 58 when the respective connector rotates about its axis.

FIGS. 3 and 4 depict coolant oil flow 70, 72 during operation of a vehicle as a result of an implementation of the system 10 of the present disclosure. When the vehicle experiences a change in motion or a tilt of the vehicle frame, the distribution of coolant oil flow 70, 72 to the end turn portions 30 may be affected. Such change in motion or tilt of the vehicle frame may result in an uneven or a maldistribution of coolant oil to the end turn portions 30 without implementation of the system 10. In accordance with the present disclosure, the system 10 provides a more even distribution of coolant to the motor 12 by moving the connectors and cams 64 to thereby move the nozzles 54 across the end turn portions 30. As shown in FIGS. 3 and 4, coolant flow 70, 72 is affected by implementation of the system 10. As a result, the system 10 compensates for a potential maldistribution of coolant oil to the motor 12.

Referring to FIGS. 1 and 3-4, the system 10 further comprises an actuator 80, a controller 82, a sensor 84, and a power source 86. The actuator 80 is in communication with the connector. That is, the actuator 80 is arranged to move the first and second connectors 60, 62 and the cams 64. Movement of the connectors and cams 64 thereby moves the second open end 58 of the nozzle 54 over the end turn portions 30.

Moreover, the sensor 84 is configured to sense one of a change in motion or frame tilt of the vehicle. When one of a change in motion or a frame tilt is sensed, the sensor 84 is arranged to send a signal 88 related to the change in motion or the frame tilt to the controller 82. It is understood that the sensor 84 may be disposed in any suitable location of the vehicle (e.g., adjacent the front wheels, steering wheel, center of vehicle) to sense a change in motion or frame tilt of the vehicle without departing from the spirit or scope of the present disclosure.

The controller 82 is in communication with the actuator 80 and configured to control the actuator 80 for improved distribution of oil coolant when the signal 88 is received from the sensor 84. In this embodiment, the power source 86 is configured to power the actuator 80, the controller 82 and the sensor 84.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An interior permanent magnet motor having controllable coolant distribution, the motor comprising:
   a motor housing;
   a rotary shaft connected to a rotor, the rotor being rotatably disposed in the housing;
   a stator unit disposed in the housing and comprising conductive windings arranged about the rotor, the windings having a straight portion radially extending to an end-turn portion;
   an oil sump disposed on the housing above the stator unit, the oil sump comprising a reservoir having an inner side for containment of coolant oil and an outer side arranged above the end-turn portion, the reservoir having at least one aperture formed therethrough over the end-turn portion extending from the straight portion;
   a movable nozzle having a first open end extending to a second open end, the first open end connected to the at least one aperture such that the movable nozzle and the reservoir are in fluid communication, the second open end extending from the at least one aperture and positioned adjacently above the end turn portion for coolant distribution;
   a connector being movably disposed in the housing proximate to the movable nozzle;
   a cam having a first portion extending to a second portion, the first portion being connected to the connector and the second portion being in contact with the nozzle,
   wherein, upon movement of the connector, the cam is arranged with the connector to move the second open end of the nozzle over the end turn portion for distribution of coolant oil from the oil sump to the end turn portion.

2. The motor of claim 1 wherein the stator unit comprises a core within which the conductive windings are radially disposed and radially extending therefrom, the core being disposed about the straight portion of the windings, the end-turn portion radially extending from the core.

3. The motor of claim 2 wherein the straight portion has a first radial side extending to a second radial side, the end-turn portion having a first turn portion radially extending from the first radial side and a second turn portion radially extending from the second radial side, the core being arranged about the straight portion of the windings, the first and second turn portions radially extending from the core.

4. The motor of claim 3 wherein the at least one aperture is a plurality of apertures, each of the plurality of apertures being formed through the reservoir over one of the first and second turn portions extending from the core.

5. The motor of claim 4 wherein the movable nozzle is a plurality of movable nozzles, each of the plurality of apertures being connected to one of the plurality of movable nozzles such that the reservoir and each of the plurality of movable nozzles are in fluid communication, each of the second open end extending from the reservoir and positioned adjacently above one of the first and second turn portions for coolant distribution.

6. The motor of claim 5 wherein the connector is a plurality of connectors movably disposed in the housing proximate the plurality of movable nozzles, the plurality of connectors comprising a plurality of cams, each of the plurality of cams having the first portion extending to the second portion, the first portion being connected to the connector and the second portion being in contract with one of the plurality of nozzles,
   wherein upon movement of each of the connectors, each of the plurality of cams is arranged to move one of the second open ends of one of the nozzles over one of the first and second turn portions for distribution of coolant oil from the oil sump.

7. The motor of claim 1 wherein the movable nozzle is comprised of polymeric material.

8. The motor of claim 7 wherein the second portion of the cam is in slidable contact with the nozzle by way of a connecting track.

9. The motor of claim 1 wherein the movable nozzle is comprised of metallic material.

10. The motor of claim 9 wherein the cam is comprised of metal and the second portion of the cam is in slidable magnetic contact with the nozzle by way of a connecting magnet.

11. An interior permanent magnet motor having controllable coolant distribution, the motor comprising:
    a motor housing;

a rotary shaft connected to a rotor, the rotor being rotatably disposed in the housing;

a stator unit disposed in the housing and comprising a core within which conductive windings are radially disposed and radially extending therefrom, the windings being arranged about the rotor and having a straight portion radially extending to an end-turn portion, the core being arranged about the straight portion of the windings, the end-turn portion radially extending from the core;

an oil sump disposed on the housing above the core, the oil sump comprising a reservoir having an inner side for containment of coolant oil and an outer side arranged above the core, the reservoir having at least one aperture formed therethrough over the end-turn portion extending from the core;

a movable nozzle having a first open end extending to a second open end, the first open end connected to the at least one aperture such that the movable nozzle and the reservoir are in fluid communication, the second open end extending from the at least one aperture and positioned adjacently above the end turn portion for coolant distribution;

a connector being movably disposed in the housing proximate to the movable nozzle;

a cam having a first portion extending to a second portion, the first portion being connected to the connector and the second portion being in contact with the nozzle, wherein, upon movement of the connector, the cam is arranged with the connector to move the second open end of the nozzle over the end turn portion for distribution of coolant oil from the oil sump to the end turn portion.

12. The motor of claim 11 wherein the straight portion has a first radial side extending to a second radial side, the end-turn portion having a first turn portion radially extending from the first radial side and a second turn portion radially extending from the second radial side, the core being arranged about the straight portion of the windings, the first and second turn portions radially extending from the core.

13. The motor of claim 12 wherein the at least one aperture is a plurality of apertures, each of the plurality of apertures being formed through the reservoir over one of the first and second turn portions extending from the core.

14. The motor of claim 13 wherein the movable nozzle is a plurality of movable nozzles, each of the plurality of apertures being connected to one of the plurality of movable nozzles such that the reservoir and each of the plurality of movable nozzles are in fluid communication, each of the second open end extending from the reservoir and positioned adjacently above one of the first and second turn portions for coolant distribution.

15. The motor of claim 14 wherein the connector is a plurality of connectors movably disposed in the housing proximate the plurality of movable nozzles, wherein the cam is a plurality of cams connected to one of the plurality of connectors, each of the plurality of cams having the first portion extending to the second portion, the first portion being connected to one of the connectors and the second portion being in contact with one of the plurality of nozzles, wherein upon movement of each of the connectors, each of the plurality of cams is arranged to move one of the second open ends of one of the nozzles over one of the first and second turn portions for distribution of coolant oil from the oil sump.

16. The motor of claim 15 wherein the movable nozzle is comprised of metallic material and the cam is comprised of metal, the second portion of the cam being in slidable magnetic contact with the nozzle by way of a connecting magnet.

17. A system for controlling coolant distribution in an interior permanent magnet motor of a vehicle having a frame, the system comprising:

an interior permanent magnet motor comprising:
  a motor housing;
  a rotary shaft connected to a rotor, the rotor being rotatably disposed in the housing;
  a stator unit disposed in the housing and comprising conductive windings arranged about the rotor, the windings having a straight portion radially extending to an end-turn portion;
  an oil sump disposed on the housing above the stator unit, the oil sump comprising a reservoir having an inner side for containment of coolant oil and an outer side arranged above the end-turn portion, the reservoir having at least one aperture formed therethrough over the end-turn portion extending from the straight portion;
  a movable nozzle having a first open end extending to a second open end, the first open end connected to the at least one aperture such that the movable nozzle and the reservoir are in fluid communication, the second open end extending from the at least one aperture and positioned adjacently above the end turn portion for coolant distribution;
  a connector being movably disposed in the housing proximate to the movable nozzle;
  a cam having a first portion extending to a second portion, the first portion being connected to the connector and the second portion being in contact with the nozzle, wherein upon movement of the connector the cam is arranged with the connector to move the second open end of the nozzle over the end turn portion for distribution of coolant oil from the oil sump to the end turn portion;

an actuator in communication with the connector and arranged to move the connector and the cam, thereby moving the second open end of the nozzle over the end turn portion;

a sensor configured to sense one of a change in motion and a frame tilt of the vehicle and arranged to send a signal of the one of change in motion and the frame tilt;

a controller in communication with the actuator and configured to control the actuator when the signal is received from the sensor for improved distribution of oil coolant; and a power source configured to power one of the actuator, the sensor, and the controller.

18. The motor of claim 17 wherein the stator comprises a core within which the conductive windings are radially disposed and radially extending therefrom, the core being arranged about the straight portion of the windings, the end-turn portion radially extending from the core.

19. The motor of claim 18 wherein the straight portion has a first radial side extending to a second radial side, the end-turn portion having a first turn portion radially extending from the first radial side and a second turn portion radially extending from the second radial side, the core being arranged about the straight portion of the windings, the first and second turn portions radially extending from the core, wherein the at least one aperture is a plurality of apertures, each of the plurality of apertures being formed through the reservoir over one of the first and second turn portions extending from the core.

20. The motor of claim 19 wherein the movable nozzle is a plurality of movable nozzles, each of the plurality of apertures being connected to one of the plurality of movable nozzles such that the reservoir and each of the plurality of movable nozzles are in fluid communication, each second open end extending from the reservoir and positioned adjacently above one of the first and second turn portions for coolant distribution, wherein the connector is a plurality of connectors movably disposed in the housing proximate the plurality of movable nozzles, the plurality of connectors comprising a plurality of cams, each cam having the first portion extending to the second portion, the first portion being connected to the connector and the second portion being in contact with one of the plurality of nozzles, wherein upon movement of each of the connectors, each of the plurality of cams is arranged to move one of the second open ends of one of the nozzles over one of the first and second turn portions for distribution of coolant oil from the oil sump.

* * * * *